Patented Mar. 24, 1953

2,632,769

UNITED STATES PATENT OFFICE 2,632,769

ESTERS OF 2,2-DIMETHYL MALONIC ACID

Alan Bell and George C. De Croes, Kingsport, Tenn., assignors to Eastman Kodak Company, Rochester, N. Y., a corporation of New Jersey No Drawing. Application April 5, 1952, Serial No. 280,851

3 Claims. (Cl. 260—479)

This invention relates to new chemical compounds, esters of 2,2-dimethyl malonic acid. More particularly, it relates to the diphenyl and di-p-tert-butylphenyl esters of 2,2-dimethyl malonic acid,

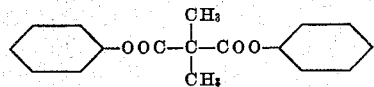

and

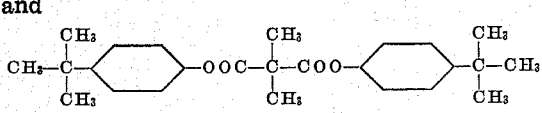

We have prepared these esters as follows:

*Example 1.—Diphenyl ester of 2,2-dimethyl malonic acid*

A solution of 75 parts of 2,2-dimethylmalonyl chloride and 94 parts of phenol in 300 parts of acetone was treated at 40° C. with a solution of 40 parts of sodium hydroxide in 500 parts of water. The mixture was stirred at 25°–40° C. for four hours and the resultant crystalline product was filtered and dried. The yield was 125 parts of a product which melted at 106° to 108° C. Recrystallization from methanol gave a purified product which melted at 108° to 110° C.

Analysis:
  Calc.: C, 71.81; H, 5.68
  Found: C, 71.80; H, 5.88

The yield of crude product was approximately 97%.

*Example 2.—Di-p-tert-butylphenyl ester of 2,2-dimethyl malonic acid*

A solution of 102 parts of p-tert-butylphenol, 300 parts of 10% aqueous solution of sodium hydroxide, and 300 parts of acetone was stirred and treated with 58 parts of 2,2-dimethylmalonyl chloride. A white product separated and, after a half hour, was filtered, washed, and dried to give 125 parts of a product which melted at 134°–137° C. This was recrystallized from an alcohol-benzene mixture; it then melted at 140–142° C. (micro).

Analysis:
  Calc.: C, 75.73; H, 8.1
  Found: C, 75.9; H, 8.3

Our novel esters are oxidation-resistant, and are useful as plasticizers for cellulose derivatives, particularly cellulose esters of lower fatty acids, such, for instance, as cellulose acetate, cellulose acetate-propionate, and cellulose acetate-butyrate. Cellulose ester compositions plasticized with our novel esters are claimed in our co-pending application Serial No. 277,902, filed March 21, 1952.

What we claim as our invention and desire to be secured by Letters Patent of the United States is:

1. An ester of 2,2-dimethyl malonic acid selected from the group consisting of the diphenyl ester of 2,2-dimethyl malonic acid and the di-p-tert-butylphenyl ester of 2,2-dimethyl malonic acid.

2. The diphenyl ester of 2,2-dimethyl malonic acid.

3. The di-p-tert-butylphenyl ester of 2,2-dimethyl malonic acid.

ALAN BELL.
GEORGE C. DE CROES.

REFERENCES CITED

The following references are of record in the file of this patent:

UNITED STATES PATENTS

| Number | Name | Date |
|---|---|---|
| 2,138,809 | Reiff et al. | Nov. 29, 1938 |